United States Patent [19]

Winter et al.

[11] Patent Number: 5,081,322

[45] Date of Patent: Jan. 14, 1992

[54] POLYPROPYLENE WAX AND PROCESS FOR THE PRODUCTION THEREOF

[75] Inventors: Andreas Winter; Volker Dolle, both of Kelkheim; Jürgen Rohrmann, Liederbach; Martin Antberg, Hofheim am Taunus; Ludwig Böhm, Hattersheim am Main; Walter Spaleck, Liederbach, all of Fed. Rep. of Germany

[73] Assignee: Hoechst Aktiengesellschaft, Frankfurt am Main, Fed. Rep. of Germany

[21] Appl. No.: 479,401

[22] Filed: Feb. 13, 1990

[30] Foreign Application Priority Data

Feb. 15, 1989 [DE] Fed. Rep. of Germany ....... 3904468

[51] Int. Cl.$^5$ .............................................. C10L 1/16
[52] U.S. Cl. ........................................ 585/9; 585/521; 585/522; 585/523; 585/524; 585/527; 585/946
[58] Field of Search ................... 585/9, 521, 522, 523, 585/524, 527, 946

[56] References Cited

U.S. PATENT DOCUMENTS

| | | | |
|---|---|---|---|
| 4,658,078 | 4/1987 | Slaugh et al. | 585/523 |
| 4,704,491 | 11/1987 | Tsutsui et al. | 585/524 |
| 4,769,510 | 9/1988 | Kaminsky et al. | 585/523 |
| 4,777,314 | 11/1988 | Provin et al. | 585/523 |
| 4,914,253 | 4/1990 | Chang | 585/524 |
| 4,926,002 | 5/1990 | Kohara et al. | 585/524 |
| 4,962,248 | 10/1990 | Winter et al. | 585/946 |

FOREIGN PATENT DOCUMENTS

| | | |
|---|---|---|
| 0284707 | 10/1988 | European Pat. Off. |
| 3148229 | 6/1983 | Fed. Rep. of Germany |
| 3743321 | 6/1989 | Fed. Rep. of Germany |
| 59-206409 | 11/1984 | Japan |
| 62-129303 | 6/1987 | Japan |

OTHER PUBLICATIONS

Patent Abs. of Japan, Band 11, Nr. 357 (C-458) [2804] 20 11/20/87.

Primary Examiner—Patrick P. Garvin
Assistant Examiner—E. D. Irzinski

[57] ABSTRACT

Polyolefin waxes are obtained in high yield by copolymerizing propylene with small amounts of other olefins in the presence of a catalyst composed of a metallocene of the formula I:

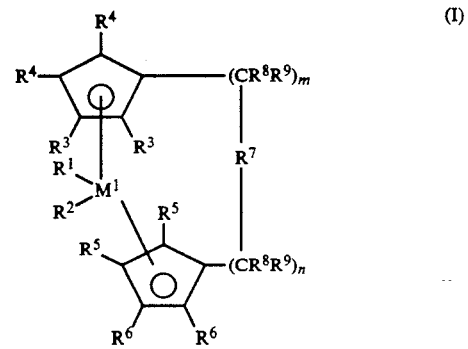

and an alumoxane. The waxes are produced as compact, spherical particles having a narrow particle size distribution and high apparent density. In addition, the physical data of these waxes such as, for example, hardness, melting point, melt viscosity etc., are variable within wide limits.

The polymer chains are noteworthy for a homogeneous and uniform structure, the comonomer units being predominantly arranged individually between polypropylene blocks.

18 Claims, No Drawings

POLYPROPYLENE WAX AND PROCESS FOR THE PRODUCTION THEREOF

DESCRIPTION

The invention relates to a polypropylene wax whose polymer chains are of high uniformity as regards chain length and chain structure.

The production of isotactic polyolefin waxes (isotactic index 80 to 85%, enthalpy of fusion 63 J/g, mixture of atactic and isotactic polyolefin chains) by means of supported catalysts, cocatalysts and stereoregulators at a temperature of over 95° C. is known (cf. DE 3,148,229). Large amounts of hydrogen have to be employed as molar mass regulator.

Furthermore, an $MgCl_2$ supported contact catalyst which results in crystalline PP waxes with a narrow molar mass distribution is also known (cf. JP 59/206,409). This catalyst, too, has the typical disadvantages of catalyst systems which have been developed for the production of high-molecular-weight polyolefins and consequently have a low activity in the production of low-molecular-weight polyolefins. Furthermore, here again, an undesirable mixture of isotactic and atactic chains is present in the wax product.

Wax-type random ethylene copolymers which contain an $\alpha$-olefin fraction of 1-15 mol % and which are produced using a catalyst system based on zirconium hydride metallocene/alumoxane (cf. JP 62/129,303) are also known. Such metallocenes are not, however, suitable for producing isotactic polypropylene; in addition, their activity in polypropylene polymerization is very low.

Owing to the low catalytic activity under the necessary reaction conditions, relatively high chlorine contents of, in some cases, over 1000 ppm are found in the polymer waxes if the catalyst residues are not removed by an expensive special post-treatment.

The use of metallocene/alumoxane catalyst systems has also been proposed for the production of highly isotactic 1-olefin polymer waxes (cf. DE 3,743,321).

Although it was possible to overcome the disadvantages of the processes described above with this catalyst, the high isotacticity of the products resulted in the hardness of the waxes being extremely high, and this is undesirable for a number of wax applications.

It is possible in principle to reduce the hardness by subsequently adding atactic poly-1-olefin wax. Apart from the high costs which are unacceptable and uneconomical on a large scale, this addition results in nonuniform and sticky products.

There is consequently the object of finding a process with which polyolefin waxes having lower hardness can be produced using metallocene/alum oxane catalysts.

It was found that the object can be achieved by copolymerizing propylene with other olefins in the presence of certain metallocene catalysts.

The invention consequently relates to a polypropylene wax composed of 80 to 99.75% by weight, based on the total polymer, of propylene units and 0.25 to 20% by weight, based on the total polymer, of units which are derived from ethylene or an olefin containing not less than 4 carbon atoms of the formula $R^{15}$—CH=CH—$R^{16}$, in which $R^{15}$ and $R^{16}$ are identical or different and are a hydrogen atom or an alkyl radical containing 1 to 28 carbon atoms or $R^{15}$ and $R^{16}$ form a ring containing 4 to 28 carbon atoms with the carbon atoms joining them, which polypropylene wax has a molar mass $M_w$ of 1,000 to 50,000 g/mol, a polydispersity $M_w/M_n$ of 1.8 to 5.0, a viscosity number of 2 to 60 cm$^3$/g, a melting point of 50° to 250° C., an enthalpy of fusion $\Delta H$ of less than 100 J/g, a dropping point of 60° to 160° C., a melt viscosity at 170° C. of 100 to 20,000 mPa.s and a regular distribution of the comonomer units in the polymer chain, the mean block length n being less than 1.25.

The invention furthermore relates to a process for the production of the polypropylene wax as claimed in claim 1 by polymerizing 70 to 99.9% by weight, based on the total amount of the monomers, of propylene and 0.1 to 30% by weight, based on the total amount of the monomers, of not less than one representative of the group comprising ethylene and olefins containing not less than 4 carbon atoms of the formula $R^{15}$—CH=CH—$R^{16}$, in which $R^{15}$ and $R^{16}$ have the meaning stated in claim 1, at a temperature of $-60°$ C. to 100° C., at a pressure of 0.5 to 120 bar, in solution, in suspension or in the gas phase, in the presence of hydrogen as a molar mass regulator and of a catalyst which is composed of a metallocene and an alumoxane wherein the hydrogen partial pressure is 0.05 to 50 bar and the molar ratio of olefin to hydrogen is 3 to 3,000:1, and wherein the metallocene is a compound of the formula I:

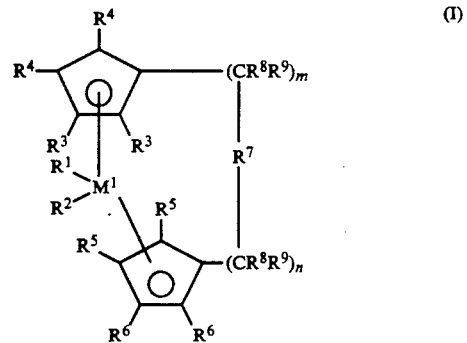

in which $M^1$ is a metal of the group IVb, Vb or VIb of the periodic system, $R^1$ and $R^2$ are identical or different and are a hydrogen atom, a ($C_1$–$C_{10}$)alkyl group, a ($C_1$–$C_{10}$)alkoxy group, a ($C_6$–$C_{10}$)aryl group, a ($C_6$–$C_{10}$)aryloxy group, a ($C_2$–$C_{10}$)alkenyl group, a ($C_7$–$C_{40}$)arylalkyl group, a ($C_7$–$C_{40}$)alkylaryl group, a ($C_8$–$C_{40}$)arylalkenyl group or a halogen atom, $R^3$, $R^4$, $R^5$ and $R^6$ are identical or different and are a hydrogen atom, a halogen atom, a ($C_1$–$C_{10}$)alkyl group, a ($C_1$–$C_{10}$)alkoxy group, a ($C_6$–$C_{10}$)aryl group, or an —$NR_2^{10}$, —$SR^{10}$, —$OSiR_3^{10}$, —$SiR_3^{10}$, or —$PR_2^{10}$ radical, in which $R^{10}$ is a ($C_1$–$C_{10}$)alkyl group, a ($C_6$–$C_{10}$)aryl group or alternatively, in the case of radicals containing silicon or phosphorus, a halogen atom, or two adjacent $R^3$, $R^4$, $R^5$ or $R^6$ radicals each form a ring with the carbon atoms joining them, $R^7$ is

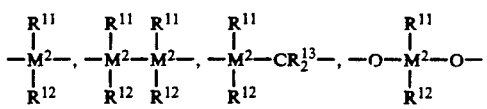

-continued

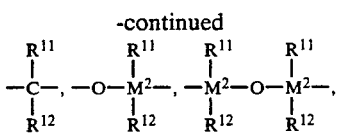

$=BR^{11}$, $=AlR^{11}$, —Ge—, —Sn—, —O—, —S—, $=SO$, $=SO_2$, $=NR^{11}$, $=CO$, $=PR^{11}$ or $=P(O)R^{11}$ where $R^{11}$, $R^{12}$ and $R^{13}$ are identical or different and are a hydrogen atom, a halogen atom, a ($C_1$–$C_{30}$)alkyl group, a ($C_1$–$C_{10}$)fluoroalkyl group, a ($C_6$–$C_{10}$)aryl group, a ($C_6$–$C_{10}$)fluoroaryl group, a ($C_1$–$C_{10}$)alkoxy group, a ($C_2$–$C_{10}$)alkenyl group, a ($C_7$–$C_{40}$)arylalkyl group, a ($C_8$–$C_{40}$)arylalkenyl group, a ($C_7$–$C_{40}$)alkylaryl group, or $R^{11}$ and $R^{12}$ or $R^{11}$ and $R^{13}$ in each case form a ring with the atoms joining them, $M^2$ is silicon, germanium or tin, $R^8$ and $R^9$ are identical or different and have the meaning stated for $R^{11}$, m and n are identical or different and are zero, 1 or 2, m plus n being zero, 1 or 2, and the alumoxane is a compound of the formula (II):

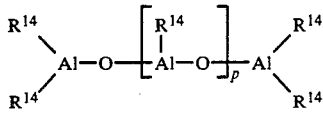

(II)

for the linear type and/or of the formula (III)

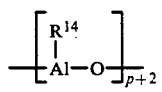

(III)

for the cyclic type, $R^{14}$ being a ($C_1$–$C_6$)alkyl group in the formulae (II) and (III) and p being an integer from 2 to 50.

The polypropylene wax according to the invention is composed of 80 to 99.75, preferably 90 to 99.5% by weight, based on the total polymer, of propylene units and of 0.25 to 20, preferably 0.5 to 15% by weight, based on the total polymer, of units which are derived from ethylene or an olefin containing at least 4 carbon atoms of the formula $R^{15}$—CH=CH—$R^{16}$. In this formula, $R^{15}$ and $R^{16}$ are identical or different and are a hydrogen atom or an alkyl radical containing 1 to 28 carbon atoms. $R^{15}$ and $R^{16}$ may, however, also form a ring containing 4 to 28 carbon atoms with the carbon atoms joining them. Examples of such olefins are 1-butene, 1-hexene, 4-methyl-1-pentene, 1-pentene, 1-octene, norbornene, norbornadiene, 6-pentene, cyclohexene or cyclooctene.

Preferred copolymer waxes are propylene/ethylene, propylene/1-hexene, propylene/1-butene and propylene/4-methyl-1-pentene polymers.

Copolymers of three different monomers are preferably propylene/ethylene/1-hexene and propylene/ethylene/1-butene terpolymer waxes.

The copolymer wax according to the invention has a molar mass $M_w$ of 1,000 to 50,000 g/mol, preferably 8,000 to 45,000 g/mol, a polydispersity $M_w/M_n$ of 1.8 to 5.0, preferably 2.0 to 4.0, a viscosity number of 2 to 60 cm³/g, preferably 10 to 50 cm³/g, a melting point of 50° to 150° C., preferably 70° to 140° C., an enthalpy fusion $\Delta H$ of less than 100 J/g, a dropping point of 60° to 160° C., preferably 80° to 150° C., a melt viscosity of 100 to 20,000 mPa.s, preferably 120 to 7,000 mPa.s, at 170° C. and a regular distribution of the comonomer units in the polymer chain, the medium comonomer block length n being less than 1.25, preferably less than 1.2.

The catalyst to be used for the process according to the invention is composed of an alumoxane and a metallocene of the formula I:

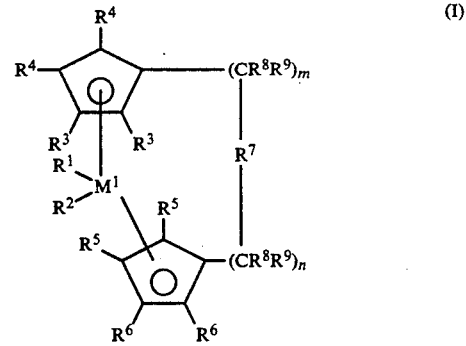

(I)

In formula I, $M^1$ is a metal of the group IVb, Vb or VIb of the periodic system, for example titanium, zirconium, hafnium, vanadium, niobium, tantalum, chromium, molybdenum or tungsten, preferably zirconium and hafnium.

$R^1$ and $R^2$ are identical or different and are a hydrogen atom, a ($C_1$–$C_{10}$)-, preferably a ($C_1$–$C_3$)alkyl group, a ($C_1$–$C_{10}$)-, preferably a ($C_1$–$C_3$)alkoxy group, a ($C_6$–$C_{10}$)-, preferably a ($C_6$–$C_8$)aryl group, a ($C_6$–$C_{10}$), preferably a ($C_6$–$C_8$)aryloxy group, a ($C_2$–$C_{10}$)-, preferably a ($C_2$–$C_4$)alkenyl group, a ($C_7$–$C_{40}$)-, preferably a ($C_7$–$C_{10}$)arylalkyl group, a ($C_7$–$C_{40}$)-, preferably a ($C_7$–$C_{12}$)alkylaryl group, a ($C_8$–$C_{40}$)-, preferably a ($C_8$–$C_{12}$)arylalkenyl group or a halogen atom, preferably chlorine.

$R^3$, $R^4$, $R^5$ and $R^6$ are identical or different and are a hydrogen atom, a halogen atom, preferably a fluorine, chlorine or bromine atom, a ($C_1$–$C_{10}$)-, preferably a ($C_1$–$C_3$)alkyl group, a ($C_6$–$C_{10}$), preferably a ($C_6$–$C_8$)aryl group, a ($C_1$–$C_{10}$)-, preferably a ($C_1$–$C_3$)alkoxy group, or an —$NR_2^{10}$, —$SR^{10}$, —$OSiR_3^{10}$, —$SiR_3^{10}$, or —$PR_2^{10}$ radical, in which $R^{10}$ is a ($C_1$–$C_{10}$), preferably a ($C_1$–$C_3$)alkyl group or a ($C_6$–$C_{10}$)-, preferably a ($C_6$–$C_8$)aryl group, or alternatively, in the case of radicals containing silicon or phosphorus, a halogen atom, preferably a chlorine atom, or two adjacent radicals $R^3$, $R^4$, $R^5$ or $R^6$ each form a ring with the carbon atoms joining them. Particularly preferred ligands are indenyl, fluorenyl and cyclopentadienyl.

$R^7$ is

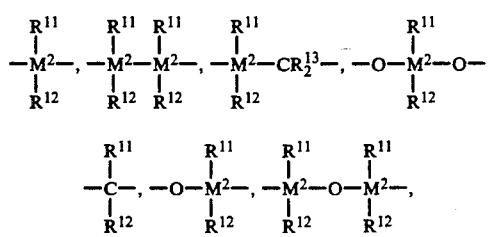

$=BR^{11}$, $=AlR^{11}$, —Ge—, —Sn—, —O—, —S—, $=SO$, $=SO_2$, $=NR^{11}$, $=CO$, $=PR^{11}$ or $=P(O)R^{11}$, where $R^{11}$, $R^{12}$ and $R^{13}$ are identical or different and are a hydrogen atom, a halogen atom, a $(C_1-C_{30})$-, preferably a $(C_1-C_4)$alkyl group, in particular a methyl group, a $(C_1-C_{10})$fluoroalkyl group, preferably a $CF_3$ group, a $(C_6-C_{10})$fluoroaryl group, preferably a pentafluorophenyl group, a $(C_6-C_{10})$, preferably a $(C_6-C_8)$aryl group, a $(C_1-C_{10})$, preferably a $(C_1-C_4)$alkoxy group, in particular a methoxy group, a $(C_2-C_{10})$, preferably $(C_2-C_4)$alkenyl group, a $(C_7-C_{40})$, preferably a $(C_7-C_{10})$arylalkyl group, a $(C_8-C_{40})$-, preferably a $(C_8-C_{12})$arylalkenyl group or a $(C_7-C_{40})$, preferably a $(C_7-C_{12})$alkylaryl group, or $R^{11}$ and $R^{12}$ or $R^{11}$ and $R^{13}$ together form in each case a ring with the atoms joining them.

$M^2$ is silicon, germanium or tin, preferably silicon and germanium.

$R^7$ is preferably $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

$R^8$ and $R^9$ are identical or different and have the meaning stated for $R^{11}$.

m and n are identical or different and are zero, 1 or 2, preferably zero or 1, m plus n being zero, 1 or 2, preferably zero or 1.

The metallocenes described above can be prepared by the following general reaction scheme:

(phenyl)(vinyl)silylbisindenylzirconium dichloride and
ethylenebisindenylhafnium dichloride.
The cocatalyst is an alumoxane of the formula II:

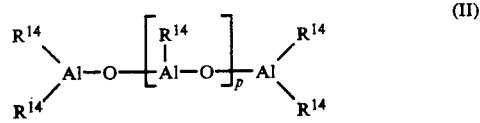

for the linear type and/or of the formula (III):

for the cyclic type. In these formulae, $R^{14}$ is a $(C_1-C_6)$alkyl group, preferably methyl, ethyl or isobutyl, in particular methyl, and p is an integer from 2 to 50, preferably 5 to 40. The precise structure of the alumoxane is, however, not known.

The alumoxane can be prepared in various ways.

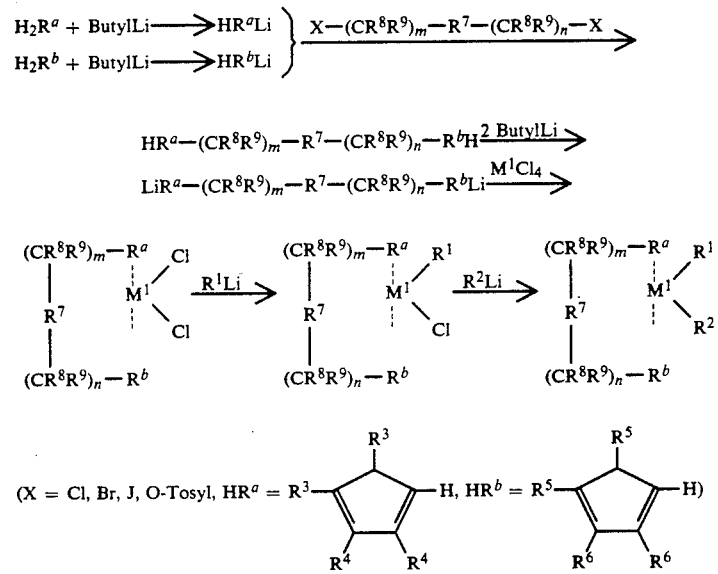

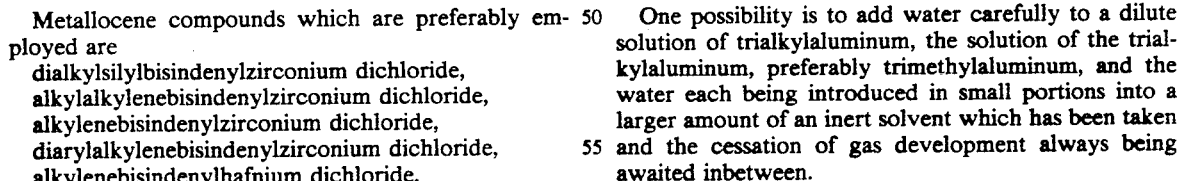

Metallocene compounds which are preferably employed are
dialkylsilylbisindenylzirconium dichloride,
alkylalkylenebisindenylzirconium dichloride,
alkylenebisindenylzirconium dichloride,
diarylalkylenebisindenylzirconium dichloride,
alkylenebisindenylhafnium dichloride,
diarylsilylbisindenylzirconium dichloride,
(aryl)(alkyl)bisindenylzirconium dichloride,
dialkylgermylbisindenylzirconium dichloride,
(alkyl)(alkenyl)silylbisindenylzirconium dichloride and
(aryl)(alkenyl)silylbisindenylzirconium dichloride.

In this connection, the following are particularly preferred:
dimethylsilylbisindenylzirconium dichloride,
ethylenebisindenylzirconium dichloride,
diphenylsilylbisindenylzirconium dichloride,
dimethylgermylbisindenylzirconium dichloride, One possibility is to add water carefully to a dilute solution of trialkylaluminum, the solution of the trialkylaluminum, preferably trimethylaluminum, and the water each being introduced in small portions into a larger amount of an inert solvent which has been taken and the cessation of gas development always being awaited inbetween.

In another process, finely powdered copper sulfate pentahydrate is suspended in toluene and mixed in a glass flask under inert gas at about $-20°$ C. with enough trialkylaluminum for about 1 mol of $CuSO_4.5H_2O$ to be available for every 4 Al atoms. After slow hydrolysis involving alkane detachment, the reaction mixture is left for 24 to 48 hours at room temperature, it possibly being necessary to cool it in order to prevent the temperature rising above 30° C. Then the alum oxane dissolved in the toluene is filtered off from the copper sulfate and the solution is evaporated down in vacuo. It is assumed that, in this process of preparation, the lowmolecular-weight alumoxane condense to form higher oligomers with the detachment of trialkylaluminum.

Furthermore, alumoxane are obtained if dissolved trialkylaluminum, preferably trimethylaluminum, is reacted with aluminum salts, preferably aluminum sulfate, containing water of crystallization at a temperature of $-20°$ to $100°$ C. in an inert aliphatic or aromatic solvent, preferably heptane or toluene. In this case, the volumetric ratio between solvent and the alkylaluminum used is 1:1 to 50:1—preferably 5:1—and the reaction time, which can be monitored by the detachment of the alkane, is 1 to 200 hours—preferably 10 to 40 hours.

Among the aluminum salts containing water of crystallization, in particular those are used which have a high content of water of crystallization. Particularly preferred is aluminum sulfate hydrate, especially the compounds $Al_2(SO_4)_3 \cdot 16H_2O$ and $Al_2(SO_4)_3 \cdot 18H_2O$, which have the particularly high content of water of crystallization of 16 or 18 mol of $H_2O$/mol of $Al_2(SO_4)_3$, respectively.

A further variant of the preparation of alumoxane is to dissolve trialkylaluminum, preferably trimethylaluminum, in the suspending agent contained in the polymerization vessel, preferably in the liquid monomer, in heptane or toluene and then to react the aluminum compound with water.

In addition to the processes described above for preparing alumoxane there are further processes which can be used. Regardless of the type of preparation, a varying content of unreacted trialkylaluminum, which is present in free form or as an adduct, is common to all alumoxane solutions.

It is possible to pre-activate the metallocene with an alumoxane of the formula (II) and/or (III) before use in the polymerization reaction. This markedly increases the polymerization activity and improves the particle morphology.

The transition metal compound is preactivated in solution. In this connection, the metallocene is preferably dissolved in a solution of the alumoxane in an inert hydrocarbon. A suitable inert hydrocarbon is an aliphatic or aromatic hydrocarbon.

Preferably toluene is employed. The concentration of the alumoxane in the solution is in the range from approximately 1 part by weight up to the saturation limit, preferably from 5 to 30% by weight, based in all cases on the total solution. The metallocene may be employed in the same concentration, preferably, however, it is employed in an amount of $10^{-4}$-1 mol per mol of alumoxane. The preactivation time is 5 minutes to 60 hours, preferably 5 to 60 minutes. A temperature of $-78°$ C. to $100°$ C., preferably $0°$ to $70°$ C., is employed.

The polymerization is carried out in a known manner in solution, in suspension or in the gas phase, continuously or batchwise, in one step or several steps at a temperature of $-60+$ to $150°$ C., preferably $0°$ to $80°$ C. The polymerization involves propylene and, as comonomer, at least one member of the group consisting of ethylene and olefins containing at least 4 carbon atoms of the formula $R^{15}$—CH=CH—$R^{16}$. In this formula, $R^{15}$ and $R^{16}$ have the meaning already stated. 70 to 99.9, preferably 80 to 99.7% by weight, based on the total amount of the monomers, of propylene and 0.1 to 30, preferably 0.3 to 20% by weight, based on the total amount of the monomers, of at least one comonomer are employed.

Hydrogen is added as molar mass regulator, the hydrogen partial pressure being in the range from 0.05 to 50 bar, preferably 0.1 to 25 bar, in particular 0.2 to 10 bar. The molar ratio of the olefins to hydrogen is 3 to 3,000, preferably 6 to 1,500, in particular 15 to 300.

The total pressure in the polymerization system is 0.5 to 120 bar. Polymerization in the industrially particularly attractive pressure range from 5 to 64 bar is preferred.

In this connection, the metallocene compound is employed in a concentration, based on the transition metal, of $10^{31}$ $^1$ to $10^{-7}$, preferably $10^{-4}$ to $10^{-6}$ mol of transition metal per $dm^3$ of solvent or per $dm^3$ of reactor volume. The alumoxane is used in a concentration of $10^{-5}$ to $10^{-1}$ mol, preferably $10^{-4}$ to $10^{-2}$ mol per $dm^3$ of solvent or per $dm^3$ of reactor volume, respectively. In principle, however, even higher concentrations are possible.

If the polymerization is carried out as a suspension or solution polymerization, an inert solvent which is normal for the Ziegler low-pressure process is used. For example, an aliphatic or cycloaliphatic hydrocarbon is employed; as such, mention may be made, for example, of butane, pentane, hexane, heptane, isooctane, cyclohexane and methylcyclohexane.

Furthermore, a gasoline or hydrogenated diesel oil fraction may be used. Toluene is also useable. Preferably, polymerization is carried out in the liquid monomer. If inert solvents are used, the monomers are added in gaseous or liquid form. If only one monomer is used as suspending agent, the comonomer is, or the comonomers are, added in gaseous or liquid form. It is furthermore possible to polymerize in a mixture of different monomers as suspending agent; a further monomer can then be added in liquid or gaseous form.

The polymerization time is indefinite since the catalyst system to be used according to the invention exhibits only a slight time-dependent drop in the polymerization activity.

Chemically highly uniform copolymer waxes can be produced by the process according to the invention.

In general, the chain ends are constructed of saturated hydrocarbon groups. The polydispersity $M_w/M_n$ is extremely narrow, with typical values of 2.0–3.0. The comonomer or the comonomers are almost exclusively incorporated individually between polypropylene blocks, and this results in an optimum reduction in the crystallinity and hardness of the copolymer waxes. Associated with this is a reduction in the enthalpy of fusion and enthalpy of crystallization, and also of the melting point and crystallization point. Depending on the process, these parameters, and in addition the melt viscosity, can be controlled precisely over a wide range by varying the amount of hydrogen and by varying the comonomers. In addition, colorless, highly transparent waxes can also be produced by means of the process according to the invention. The polymer powders produced according to the invention are composed of nonadhering, compact spherical particles having a narrow particle size distribution and high apparent density. The wax powder is noteworthy for its very good free-flowing property and can consequently be handled in an optimum manner.

The catalyst activities are very high, and this means low catalyst residue contents in the polymer for high space-time yields.

The following examples are intended to explain the invention in more detail.

Key to symbols

VN = Viscosity number in cm³/g
M_w = Weight average of molar mass  } { determined by gel permeation chromatography
M_n = Number average of molar mass     (numerical data in g/mol)
M_w/M_n = Polydispersity
MV = Melt viscosity determined by means of rotational viscometer at 170° C.
AD = Apparent density of the polymer powder in g/dm³
n_PP = Medium polypropylene block length
n_PE = Medium polyethylene block length
n_PH = Medium polyhexene block length
n_PB = Medium polybutene block length
N_PMP = Medium poly-4-methy-1-pentene block length (the block lengths were determined by means of $^{13}$C NMR spectroscopy)

Melting points, crystallization points, their full widths at half maximum, the enthalpies of fusion and crystallization, and also the glass transition temperatures (Tg) were determined by DSC measurements (heating/cooling rate 20° C./min).

EXAMPLES 1–16

A dry 16 dm³ vessel was flushed with nitrogen and filled with 40 Ndm³ (equivalent to 2.5 bar) of hydrogen and also with 10 dm³ of liquid propylene. Then 30 cm³ of toluenic methylalumoxane solution (equivalent to 40 mmol of Al, average degree of oligomerization of the methylalumoxane n=20) and also 25% by weight of the desired total amount of ethylene (see Table 1 for amounts) were added and the mixture was stirred for 15 minutes at 30° C.

In parallel with this, the amount shown in Table 1 of the zirconocene dimethylsilylbisindenylzirconium dichloride was dissolved in 15 cm³ of toluenic methylalumoxane solution (20 mmol of Al) and preactivated by being allowed to stand for 15 minutes. The orange-red solution was then introduced into the vessel. The polymerization system was brought to the polymerization temperature shown in Table 1 and was kept at this temperature by suitable cooling during the polymerization time (Table 1). The remaining amount of ethylene was added uniformly during the polymerization time.

Product amounts, metallocene activities and also the ethylene content of the polymers produced are summarized in Table 1. The product properties are to be found in Table 2.

EXAMPLES 17–19

The procedure was analogous to that of Examples 1–16, but the amount of hydrogen used as molar mass regulator was varied. Instead of 40 Ndm³, the amounts specified in Table 3 were added. The polymerization conditions are to be found in Table 3 and the product properties in Table 4.

EXAMPLES 20–24

The procedure was analogous to that in Examples 1–16, but the metallocenes ethylenebisindenylzirconium dichloride (Example 20), diphenylsilylbisindenylzirconium dichloride (Example 21), dimethylgermylbisindenylzirconium dichloride (Example 22), ethylenebisindenylhafnium dichloride (Example 23) and (vinyl)(phenyl)silylbisindenylzirconium dichloride (Example 24) were used instead of dimethylsilylbisindenylzirconium dichloride. The polymerization conditions are to be found in Table 5 and the product properties in Table 6.

EXAMPLES 25–27

The procedure was analogous to that of Examples 1–16, but the comonomers 1-hexene (Example 25), 1-butene (Example 26) and 4-methyl-1-pentene (Example 27) were used instead of the comonomer ethylene. The polymerization conditions are to be found in Table 7 and the product properties in Table 8.

EXAMPLE 28

A dry 16 dm³ vessel was flushed with nitrogen and filled with 10 dm³ of liquid propylene. Then 30 cm³ of toluenic methylalumoxane solution (equivalent to 40 mmol of Al, average degree of oligomerization of the methylalum oxane n=20) were added and the mixture was stirred for 15 minutes.

In parallel with this, 8.5 mg (0.019 mmol) of dimethylsilylbisindenylzirconium dichloride were dissolved in 15 cm³ of toluenic methylalumoxane solution (20 mmol of Al). After 15 minutes, the orange-red solution was introduced into the vessel. The polymerization system was brought to 50° C. and then 85 g of ethylene were continuously adding during the 60-minute polymerization time. 1.1 kg of polymer powder, equivalent to a metallocene activity of 129.4 kg of polymer/g of catalyst×h were obtained.

The ethylene incorporated was 7.1% by weight.

Block length: $n_{PP}$=9.2, nhd PE=1.05, VN=39 cm³/g; $M_w$=24,750, $M_n$=9,850, $M_w/M_n$=2.5; AD=330 g/dm³; MV=1,350 mPa.s;

Dropping point 128° C.; melting point 108° C.,

Crystallization point 69° C., glass transition temperature −24° C.,

Enthalpy of fusion 52.8 J/g, enthalpy of crystallization −40.1 J/g.

COMPARISON EXAMPLE A

A dry 16 dm³ vessel was flushed with nitrogen and filled with 40 Ndm³ (equivalent to 2.5 bar) of hydrogen, with 10 dm³ of liquid propylene and 140 g of ethylene. Then 30 cm³ of toluenic methylalumoxane solution (equivalent to 40 mmol of Al, average degree of oligomerization of the aluminoxane n=20) were added and the mixture was stirred for 15 minutes.

In parallel with this, 8.5 mg (0.019 mmol) of dimethylsilylbisindenylzirconium dichloride were dissolved in 15 cm³ of toluenic methylalumoxane solution (20 mmol of Al). After 15 minutes, the orange-red solution was introduced into the vessel. Polymerization was carried out for 60 minutes at 50° C. 2.0 kg of polymer powder were obtained, equivalent to a metallocene activity of 235.3 kg of polymer/g of catalyst×h. The ethylene incorporated was 6.8% by weight. VN=38 cm³/g, $M_w$=24,950, $M_n$=10,150, $M_w/M_n$=2.5, AD 310 g/dm³, NV=1,220 mPa.s;

dropping point 141° C.; melting point 128° C., crystallization point 91° C., glass transition temperature −32° C., enthalpy of fusion 63.5 J/g, enthalpy of crystallization −50.7 J/g.

Taking the entire amount of comonomer results in a considerably different product from that which is obtained by taking 25% of the total amount of monomer and continuously adding the remaining comonomer during the polymerization (Examples 8 and 9) or which is obtained by exclusively adding the comonomer during the polymerization (Example 28). Dropping point, melting point, crystallization point, enthalpy of fusion and also enthalpy of crystallization are considerably higher. According to $^{13}$C NMR, a product with a higher medium block length $n_{PE}$ is obtained.

EXAMPLE 29

A dry 16 dm$^3$ vessel was flushed with nitrogen and filled with 40 Ndm$^3$ (equivalent to 2.5 bar) of hydrogen, with 10 dm$^3$ of liquid propylene, with 300 g of 1-hexene and 17.5 g of ethylene. Then 30 cm$^3$ of toluenic methylalumoxane solution (equivalent to 40 mmol of Al, average degree of oligomerization n=20) were added and the mixture was stirred for 15 minutes.

In parallel with this, 8.5 mg (0.019 mmol) of dimethylsilylbisindenylzirconium dichloride were dissolved in 15 cm$^3$ of toluenic methylalumoxane solution (20 mmol of Al).

After 15 minutes, the orange-red solution was introduced into the vessel. Polymerization was carried out for 60 minutes at 60° C., 52.5 g of ethylene being added continuously. 2.1 kg of polymer powder, equivalent to a metallocene activity of 247.0 kg of polymer/g of catalyst×h, were obtained.

The polymer contained 2.6% by weight of hexene units, 2.5% by weight of ethylene units and 94.9% by weight of propylene units. Mean block length of the copolymers, $n_{PH}$=1.0: $n_{PE}$=1.02; VN=29.1 cm$^3$/g, $M_w$=17,400, $M_n$=8,050, $M_w/M_n$=2.2; AD=410 g/dm$^3$; MV=760 MPa.s; dropping point 118° C., melting point 106° C., crystallization point 68° C., enthalpy of fusion 70.4 J/g, enthalpy of crystallization −52.6 J/g, glass transition temperature −22° C.

EXAMPLE 30

The procedure was as in Example 29, but 500 g of 1-butene were taken instead of 300 g of 1-hexene. 1.92 kg of polymer powder, equivalent to a metallocene activity of 225.9 kg of polymer/g of catalyst×h, were obtained. The polymer contained 4.1% by weight of butene units, 2.9% by weight of ethylene units and 93.0% by weight of propylene units. The mean block lengths of the copolymers were: $n_{PE}$=1.04 and $n_{PB}$=1.09. VN=30 cm$^3$/g; $M_w$=19,100, $M_n$=9,100, $M_w/M_n$=2.1; AD=370 g/dm$^3$, MV=760 mPa.s; dropping point 120° C., melting point 110° C., crystallization point 70° C., enthalpy of fusion 76.1 J/g, enthalpy of crystallization −62.0 J/g, glass transition temperature −21° C.

TABLE 1

Examples 1-16 (Polymerization data)

| Example | g Ethylene total | mg/(mmol) zirconocene | Polymerization temperature [°C.] | Polymerization time [minutes] | Amount of product [kg] | Metallocene activity [kg polymer/ g cat × h] | Content of comonomer units [% by weight] |
|---|---|---|---|---|---|---|---|
| 1 | 12 | 12.0 (0,027) | 60 | 60 | 2.25 | 187.5 | 0.5 |
| 2 | 26 | 15.5 (0,035) | " | 45 | 2.95 | 253.8 | 0.7 |
| 3 | 45 | 11.8 (0,026) | " | 50 | 2.16 | 219.7 | 2.0 |
| 4 | 70 | 6.9 (0,015) | " | 60 | 2.82 | 408.7 | 2.4 |
| 5 | 80 | 8.6 (0,019) | " | " | 2.88 | 334.9 | 2.6 |
| 6 | 100 | 8.1 (0,018) | " | " | 1.73 | 213.6 | 5.6 |
| 7 | 110 | 13.4 (0,030) | " | " | 2.30 | 171.6 | 4.6 |
| 8 | 150 | 7.8 (0,017) | " | 75 | 1.97 | 202.1 | 7.3 |
| 9 | 160 | 6.8 (0,015) | " | " | 2.32 | 272.9 | 6.5 |
| 10 | 200 | 6.8 (0,015) | " | 60 | 1.61 | 236.8 | 12.0 |
| 11 | 300 | 7.8 (0,017) | " | " | 1.90 | 243.6 | 15.1 |
| 12 | 40 | 11.6 (0,026) | 50 | " | 2.21 | 190.5 | 1.7 |
| 13 | 80 | 12.1 (0,027) | " | 30 | 1.45 | 239.7 | 5.5 |
| 14 | 100 | 11.3 (0,025) | " | 60 | 1.60 | 141.6 | 6.2 |
| 15 | 125 | 14.1 (0,031) | " | 57 | 1.85 | 131.2 | 6.5 |
| 16 | 140 | 8.4 (0,019) | " | 60 | 1.50 | 178.6 | 8.8 |

TABLE 2

Examples 1-16 (Product properties)

| Example | VN [cm$^3$/g] | $M_w$ [g/mol] | $M_n$ [g/mol] | $M_w/M_n$ | AD [g/dm$^3$] | MV [mPa.s] | Dropping point [°C.] | Mean block length $n_{PP}$ | Mean block length $n_{PE}$ | Melting point [°C.] | Crystallization point [°C.] | Glass trans. temp. [°C.] | Enthalpy of fusion [J/g] | Enthalpy of crystallization [J/g] |
|---|---|---|---|---|---|---|---|---|---|---|---|---|---|---|
| 1 | 22 | 12500 | 5850 | 2.1 | 420 | 300 | 146 | 130 | 1.0 | 137 | 100 |  | 98.5 | −90.0 |
| 2 | 21 | 12300 | 5670 | 2.2 | 415 | 300 | 143 | 90 | 1.0 | 135 | 98 |  | 93.2 | −91.7 |
| 3 | 25 | 13900 | 6590 | 2.1 | 525 | 500 | 134 | 28.7 | 1.01 | 124 | 86 |  | 84.4 | −74.6 |
| 4 | 26 | 15350 | 7200 | 2.1 | 490 | 580 | 133 | 25.5 | 1.02 | 122 | 82 | −18 | 85.4 | −73.6 |
| 5 | 25 | 14750 | 6700 | 2.2 | 460 | 450 | 130 | 25.0 | 1.02 | 121 | 81 | −18 | 83.2 | −72.9 |
| 6 | 30 | 18700 | 7360 | 2.5 | 325 | 800 | 120 | 11.8 | 1.04 | 108 | 70 | −20 | 70.0 | −53.3 |
| 7 | 29 | 17750 | 8050 | 2.2 | 420 | 740 | 120 | 14.5 | 1.02 | 108 | 69 | −20 | 74.3 | −60.1 |
| 8 | 36 | 22600 | 8670 | 2.6 | 420 | 1640 | 118 | 9.4 | 1.10 | 93 | 56 | −25 | 53.7 | −38.5 |
| 9 | 34 | 21200 | 9800 | 2.2 | 470 | 1150 | 118 | 9.9 | 1.03 | 98 | 57 | −23 | 61.6 | −45.8 |

TABLE 2-continued

Examples 1-16
(Product properties)

| Example | VN [cm³/g] | $M_w$ [g/mol] | $M_n$ [g/mol] | $M_w/M_n$ | AD [g/dm³] | MV [mPa.s] | Dropping point [°C] | Mean block length $n_{PP}$ | Mean block length $n_{PE}$ | Melting point [°C] | Crystallization point [°C] | Glass trans. temp. [°C] | Enthalpy of fusion [J/g] | Enthalpy of crystallization [J/g] |
|---|---|---|---|---|---|---|---|---|---|---|---|---|---|---|
| 10 | 45 | 31750 | 15120 | 2.1 | 460 | 3450 | 101 | 4.9 | 1.05 | 88 | 46 | −26 | 39.2 | −29.1 |
| 11 | 51 | 43250 | 18800 | 2.3 | 450 | 5820 | 94 | 3.6 | 1.08 | 81 | 43 | −30 | 24.9 | −19.1 |
| 12 | 29 | 18350 | 7470 | 2.4 | 325 | 700 | 140 | 39.0 | 1.03 | 131 | 96 | −9 | 97.5 | −82.8 |
| 13 | 35 | 21600 | 8960 | 2.4 | 370 | 1450 | 125 | 11.6 | 1.02 | 104 | 64 | −19 | 68.4 | −52.0 |
| 14 | 38 | 22850 | 10000 | 2.3 | 440 | 1570 | 128 | 10.5 | 1.02 | 100 | 60 | −21 | 64.4 | −49.0 |
| 15 | 38 | 22100 | 8740 | 2.5 | 400 | 1930 | 129 | 10.0 | 1.03 | 99 | 58 | −21 | 61.8 | −46.3 |
| 16 | 42 | 26100 | 12150 | 2.1 | 300 | 2800 | 118 | 7.3 | 1.02 | 86 | 48 | −25 | 56.0 | −34.3 |

TABLE 3

Examples 17-19
(Polymerization data)

| Example | Amount of hydrogen [Ndm³] | Amount of hydrogen [bar] | g Comonomer | mg (mmol) zirconocene | Polymerization temperature [°C] | Polymerization time [minutes] | Amount of product [kg] | Metallocene activity [kg polymer/g cat × h] | Content of comonomer units [% by weight] |
|---|---|---|---|---|---|---|---|---|---|
| 17 | 8 | 0.5 | 80 g Ethylene | 9.5 (0.021) | 60 | 60 | 3.57 | 375.8 | 2.1 |
| 18 | 16 | 1 | 80 g Ethylene | 11.2 (0.025) | 60 | 45 | 3.69 | 439.3 | 2.1 |
| 19 | 80 | 5 | 140 g Ethylene | 6.5 (0.015) | 60 | 60 | 2.80 | 430.8 | 4.8 |

TABLE 4

Example 17-19
(Product properties)

| Example | VN [cm³/g] | $M_w$ [g/mol] | $M_n$ [g/mol] | $M_w/M_n$ | AD [g/dm³] | MV [mPa.s] | Dropping point [°C] | Mean block length $n_{PP}$ | Mean block length $n_{PE}$ | Melting point [°C] | Crystallization point [°C] | Glass trans. temp. [°C] | Enthalpy of fusion [J/g] | Enthalpy of crystallization [J/g] |
|---|---|---|---|---|---|---|---|---|---|---|---|---|---|---|
| 17 | 48.1 | 34750 | 15050 | 2.3 | 510 | 4590 | 133 | 29.6 | 1.01 | 121 | 86 | −14 | 79.2 | −68.4 |
| 18 | 37.0 | 23850 | 9930 | 2.4 | 500 | 1820 | 132 | 32.1 | 1.03 | 123 | 79 | −15 | 82.3 | −71.2 |
| 19 | 24.2 | 12600 | 5930 | 2.1 | 480 | 420 | 123 | 13.2 | 1.05 | 109 | 71 | −21 | 74.9 | −58.2 |

TABLE 5

Examples 20-24
(Polymerization data)

| Example | mg (mmol) Metallocene compound | g Comonomer | Polymerization temperature [°C] | Polymerization time [minutes] | Amount of product [kg] | Metallocene activity [kg polymer/g cat × h] | Comonomer content [% by weight] |
|---|---|---|---|---|---|---|---|
| 20 | 8.3 (0.020) Ethylenebisindenyl-zirconium dichloride | 100 g Ethylene | 60 | 60 | 2.48 | 298.8 | 3.7 |
| 21 | 25.6 (0.045) Diphenylsilylbis-indenylzirconium dichloride | 110 g Ethylene | 60 | 60 | 2.06 | 80.5 | 5.1 |
| 22 | 8.1 (0.016) Dimethylgermyl-bisindenylzirconium dichloride | 90 g Ethylene | 60 | 53 | 3.02 | 422.1 | 2.9 |
| 23 | 36.9 (0.073) Ethylenebisindenyl-hafnium dichloride | 110 g Ethylene | 60 | 240 | 2.35 | 15.9 | 4.4 |
| 24 | 24.0 (0.046) (Vinyl)(phenyl)-silylbisindenylzirconium dichloride | 110 g Ethylene | 60 | 60 | 2.33 | 97.1 | 4.4 |

TABLE 6

Examples 20-24
(Product properties)

| Example | VN [cm³/g] | $M_w$ [g/mol] | $M_n$ [g/mol] | $M_w/M_n$ | AD [g/dm³] | MV [mPa.s] | Dropping point [°C] | Mean block length $n_{PP}$ | Mean block length $n_{PE}$ | Melting point [°C] | Crystallization point [°C] | Glass trans. temp. [°C] | Enthalpy of fusion [J/g] | Enthalpy of crystallization [J/g] |
|---|---|---|---|---|---|---|---|---|---|---|---|---|---|---|
| 20 | 19.1 | 10950 | 5065 | 2.2 | 460 | 220 | 124 | 17.2 | 1.02 | 109 | 73 | −22 | 74.0 | −58.2 |
| 21 | 29.2 | 18650 | 8550 | 2.2 | 470 | 860 | 116 | 12.5 | 1.02 | 103 | 63 | −22 | 64.1 | −49.7 |
| 22 | 22.4 | 13350 | 6600 | 2.0 | 490 | 350 | 133 | 20.7 | 1.04 | 119 | 81 | −20 | 83.7 | −71.0 |
| 23 | 19.1 | 10750 | 3640 | 3.0 (bimo- | 450 | 200 | 123 | 14.3 | 1.03 | 120 | 84 | −30 | 68.3 | −51.8 |

TABLE 6-continued

Examples 20-24
(Product properties)

| Example | VN [cm³/g] | $M_w$ [g/mol] | $M_n$ [g/mol] | $M_w/M_n$ | AD [g/dm³] | MV [mPa.s] | Dropping point [°C.] | Mean block length $n_{PP}$ | Mean block length $n_{PE}$ | Melting point [°C.] | Crystallization point [°C.] | Glass trans. temp. [°C.] | Enthalpy of fusion [J/g] | Enthalpy of crystallization [J/g] |
|---|---|---|---|---|---|---|---|---|---|---|---|---|---|---|
| 24 | 29.3 | 16900 | 7350 | 2.3 (dal) | 460 | 740 | 124 | 15.6 | 1.02 | 107 | 68 | −24 | 70.2 | −56.1 |

TABLE 7

Examples 25-27
(Polymerization data)

| Example | g Comonomer | mg (mmol) zirconocene | Polymerization temperature [°C.] | Polymerization time [minutes] | Amount of product [kg] | Metallocene activity [kg polymer/g cat × h] | Content of comonomer units [% by weight] |
|---|---|---|---|---|---|---|---|
| 25 | 200 g 1-Hexen | 8.3 (0.019) | 60 | 60 | 1.32 | 159.0 | 2.0 |
| 26 | 1000 g 1-Buten | 8.2 (0.018) | " | 90 | 1.61 | 130.9 | 10.4 |
| 27 | 500 g 4-Methyl-1-penten | 9.0 (0.020) | " | 60 | 1.37 | 152.2 | 3.6 |

TABLE 8

Examples 25-27
(Product properties)

| Example | VN [cm³/g] | $M_w$ [g/mol] | $M_n$ [g/mol] | $M_w/M_n$ | AD [g/mol] | MV [mPa.s] | Dropping point [°C.] | $n_{PP}$ | $n_{PM}$ | $n_{PB}$ | $n_{PMP}$ | Melting point [°C.] | Crystallization point [°C.] | Enthalpy of fusion [J/g] | Enthalpy of crystallization [J/g] |
|---|---|---|---|---|---|---|---|---|---|---|---|---|---|---|---|
| 25 | 20 | 10200 | 4800 | 2.1 | 380 | | 100 | 1.0 | — | — | — | 127 | 90 | 91.4 | −78.0 |
| 26 | 18 | 9870 | 4700 | 2.1 | 390 | | | 11.5 | — | 1.10 | — | 115 | 80 | 85.1 | −74.1 |
| 27 | 17 | 7650 | 3900 | 2.0 | 400 | | | 53.5 | — | — | 1.05 | 115 | 76 | 79.5 | −68.9 |

We claim:

1. A polypropylene wax comprised of 80 to 99.75% by weight, based on the total polymer, of propylene units and 0.25 to 20% by weight, based on the total polymer, of units which are derived from ethylene or an olefin containing not less than 4 carbon atoms of the formula R¹⁵—CH=CH—R¹⁶, in which R¹⁵ and R¹⁶ are identical or different and are a hydrogen atom or an alkyl radical containing 1 to 28 carbon atoms or R¹⁵ and R¹⁶ form a ring containing 4 to 28 carbon atoms with the carbon atoms joining them, which polypropylene wax has a molar mass $M_w$ of 1,000 to 50,000 g/mol, a polydispersity $M_w/M_n$ of 1.8 to 5.0, a viscosity number of 2 to 60 cm³/g, a melting point of 50° to 150° C., an enthalpy of fusion ΔH of less than 100 J/g, a dropping point of 60° to 160° C., a melt viscosity at 170° C. of 100 to 20,000 mPa.s and a regular distribution of the comonomer units in the polymer chain, the mean block length n being less than 1.25.

2. A process for the production of the polypropylene wax as claimed in claim 1 by polymerizing 70% to 99.9% by weight, based on the total amount of the monomers, of propylene and 0.1% to 30% by weight, based on the total amount of the monomers, of not less than one representative of the group comprising ethylene and olefins containing not less than 4 carbon atoms of the formula R¹⁵—CH=CH—R¹⁶, in which R¹⁵ and R¹⁶ have the meaning stated in claim 1, at a temperature of −60° C. to 100° C., at a pressure of 0.5 bar to 120 bar, in solution, in suspension or in the gas phase, in the presence of hydrogen as a molar mass regulator and of a catalyst which is comprised of a metallocene and an alumoxane wherein the hydrogen partial pressure is 0.05 bar to 50 bar and the molar ratio of olefin to hydrogen is 3 to 3,000:1, and wherein the metallocene is a compound of the formula I:

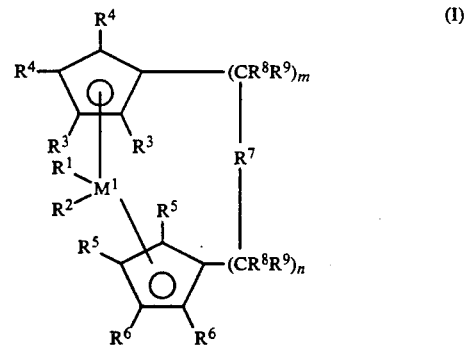

(I)

in which

M¹ is metal of the group IVb, Vb or VIb of the periodic system,

R¹ and R² are identical or different and are a hydrogen atoms, a ($C_1$-$C_{10}$)alkyl group, a ($C_1$-$C_{10}$)alkoxy group, a ($C_6$-$C_{10}$)aryl group, a ($C_6$-$C_{10}$)aryloxy group, a ($C_2$-$C_{10}$)alkenyl group, a ($C_7$-$C_{40}$)arylalkyl group, a ($C_7$-$C_{40}$)alkylaryl group, a ($C_8$-$C_{40}$)arylalkenyl group or a halogen atom, R³, R⁴, R⁵ and R⁶ are identical or different and are a hydrogen atom, a halogen atom, a ($C_1$-$C_{10}$)alkyl group, a ($C_6$-$C_{10}$)aryl group, a ($C_1$-$C_{10}$)alkoxy group, or an —NR¹⁰₂, —SR¹⁰, —OSiR¹⁰₃, —SiR¹⁰₃, or —PR¹⁰₂ radical, in which R¹⁰ is a ($C_1$-$C_{10}$)alkyl group, a ($C_6$-$C_{10}$)aryl group or alternatively, in the case of radicals containing silicon or phosphorus, a halogen atom, or two adjacent radicals $R^3$, $R^4$, $R^5$ or $R^6$ each form a ring with the carbon atoms joining them, $R^7$ is

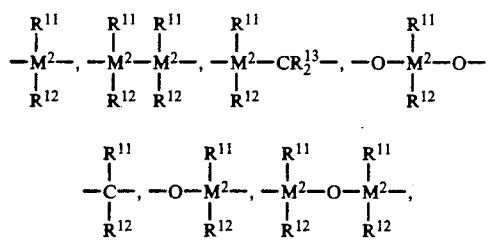

$=BR^{11}$, $=AlR^{11}$, $-Ge-$, $-Sn-$, $-O-$, $-S-$, $=SO$, $=SO_2$, $=NR^{11}$, $=CO$, $=PR^{11}$ or $=P(O)R^{11}$ where $R^{11}$, $R^{12}$ and $R^{13}$ are identical or different and are a hydrogen atom, a halogen atom, a $(C_1-C_{30})$alkyl group, a $(C_1-C_{10})$fluoroalkyl group, a $(C_6-C_{10})$aryl group, a $(C_6-C_{10})$fluoroaryl group, a $(C_1-C_{10})$alkoxy group, a $(C_2-C_{10})$alkenyl group, a $(C_7-C_{40})$arylalkyl group, a $(C_8-C_{40})$arylalkenyl group, a $(C_7-C_{40})$alkylaryl group, or $R^{11}$ and $R^{12}$ or $R^{11}$ and $R^{13}$ in each case form a ring with the atoms joining them, $M^2$ is silicon, germanium or tin, $R^8$ and $R^9$ are identical or different and have the meaning stated for $R^{11}$, m and n are identical or different and are zero, 1 or 2, m plus n being zero, 1 or 2, and the alumoxane is a compound of the formula (II):

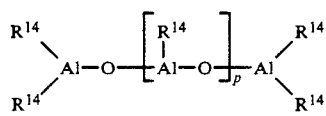 (II)

for the linear type and/or of the formula (III)

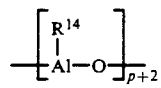 (III)

for the cyclic type, $R^{14}$ being a $(C_1-C_6)$alkyl group in the formulae (II) and (III) and p being an integer from 2 to 50.

3. The process of claim 2, wherein said olefin is 1-butene, 1-hexene, 4-methyl-1-pentene, 1-pentene, 1-octene, norbornene, norbornadiene, 6-pentene, cyclohexane or cyclooctene.

4. The polypropylene wax of claim 1, wherein said molar mass $M_w$ ranges from 8,000 to 45,000 g/mol.

5. The polypropylene wax of claim 1, wherein said polydispersity $M_w/M_n$ ranges in value from 2.0 to 4.0.

6. The polypropylene wax of claim 1, wherein said viscosity ranges in value from 10 cm$^3$/g to 50 cm$^3$/g.

7. The polypropylene wax of claim 1, wherein said melting point ranges in value from 70° C. to 140° C.

8. The polypropylene wax of claim 1, wherein said dropping point ranges in value from 80° C. to 150° C.

9. The polypropylene wax of claim 1, wherein said melt viscosity ranges in value from 120 mPa.s to 7,000 mPa.s at 170° C.

10. The polypropylene wax of claim 1, wherein said n is less than 1.2.

11. The process of claim 2, wherein said $M^1$ is zirconium or hafnium.

12. The process of claim 2, wherein said $R^1$ and $R^2$ are identical or different and are a $(C_1-C_3)$alkyl group, a $(C_1-C_3)$alkoxy group, a $(C_6-C_8)$aryl group, a $(C_6-C_8)$aryloxy group, a $(C_2-C_4)$alkenyl group, a $(C_7-C_{10})$arylalkyl group, a $(C_7-C_{12})$alkylaryl group, a $(C_8-C_{12})$arylalkenyl group or a chlorine.

13. The process of claim 2, wherein said $R^3$, $R^4$, $R^5$ and $R^6$ are identical or different and are a fluorine, chlorine or bromine atom, a $(C_1-C_3)$alkyl group, a $(C_6-C_8)$aryl group, of a $(C_1-C_3)$alkoxy group.

14. The process of claim 2, wherein said $R^{10}$ is a $(C_1-C_3)$alkyl group, or a $(C_6-C_8)$aryl group.

15. The process of claim 2, wherein said $R^{11}$, $R^{12}$, and $R^{13}$ are identical or different and a $(C_1-C_4)$alkyl group, a methyl group, a $CF_3$ group, a pentafluorophenyl group, a $(C_6-C_8)$aryl group, a $(C_1-C_4)$alkoxy group, a methoxy group, a $(C_2-C_4)$alkenyl group, a $(C_7-C_{10})$arylalkyl group, a $(C_8-C_{12})$arylalkenyl group, or a $(C_7-C_{12})$alkylaryl group.

16. The process of claim 2, wherein said $M^2$ is silicon or germanium.

17. The process of claim 2, wherein said $R^7$ is $=CR^{11}R^{12}$, $=SiR^{11}R^{12}$, $=GeR^{11}R^{12}$, $-O-$, $-S-$, $=SO$, $=PR^{11}$ or $=P(O)R^{11}$.

18. The process of claim 2, wherein said m and n are zero or 1, and m plus n is zero or 1.

* * * * *